US012632193B2

(12) United States Patent
Dutta et al.

(10) Patent No.: US 12,632,193 B2
(45) Date of Patent: May 19, 2026

(54) SELECTING DATA RELOCATION OPERATIONS BASED ON AN ENERGY THRESHOLD AND A PERFORMANCE THRESHOLD

(71) Applicant: Sandisk Technologies, Inc., Milpitas, CA (US)

(72) Inventors: Bishwajit Dutta, Banglore (IN); Saifullah Nalatwad, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 87 days.

(21) Appl. No.: 18/650,912

(22) Filed: Apr. 30, 2024

(65) Prior Publication Data

US 2025/0335114 A1     Oct. 30, 2025

(51) Int. Cl.
*G06F 3/06* (2006.01)

(52) U.S. Cl.
CPC .......... *G06F 3/0647* (2013.01); *G06F 3/0616* (2013.01); *G06F 3/0679* (2013.01)

(58) Field of Classification Search
None
See application file for complete search history.

(56) References Cited

U.S. PATENT DOCUMENTS 8,930,614 B2     1/2015  Masuo et al.
9,176,864 B2 *   11/2015  Gorobets .............. G06F 3/0679

| | | | |
|---|---|---|---|
| 9,996,281 B2 * | 6/2018 | Sharon ................... | G11C 16/26 |
| 10,339,983 B1 * | 7/2019 | Confalonieri ...... | G11C 13/0033 |
| 11,797,228 B2 | 10/2023 | Prudviraj Gunda et al. | |
| 2016/0225459 A1 | 8/2016 | Boysan et al. | |
| 2017/0032836 A1 * | 2/2017 | Kimura ................... | G11C 16/10 |
| 2021/0055878 A1 * | 2/2021 | Iwasaki ................... | G06F 12/10 |
| 2022/0261153 A1 | 8/2022 | Papa et al. | |
| 2023/0214149 A1 * | 7/2023 | Vaghasiya ............. | G06F 3/0655 |
| | | | 711/154 |

* cited by examiner

*Primary Examiner* — Michael Alsip

(74) *Attorney, Agent, or Firm* — DENTONS Durham Jones Pinegar

(57)     ABSTRACT

A data storage device includes a relocation management system that determines whether to perform a relocation operation based on an operating temperature, performance metrics and/or energy metrics associated with the data storage device. The relocation management system uses the operating temperature to identify a performance threshold and an energy threshold. Each threshold indicates whether the relocation operation is a first relocation method or a second relocation method. If the validity count of a memory block included in the relocation operation is below each threshold, the first relocation method is selected. If the validity count of the memory block is above both thresholds, the second relocation method is selected. However, if the validity count of the memory block is in a tradeoff range, the relocation management system selects a relocation method based on a tradeoff between performance metrics and energy consumption metrics.

20 Claims, 6 Drawing Sheets

200

| OPERATING TEMPERATURE | TEMPERATURE DIRECTION | PERFORMANCE THRESHOLD | ENERGY THRESHOLD |
|---|---|---|---|
| 45 C | UP | *N* | *M* |
| 45 C | DOWN | *P* | *Q* |
| 50 C | UP | *W* | *X* |
| 50 C | DOWN | *Y* | *Z* |

210        220        230        240

SELECTING DATA RELOCATION OPERATIONS BASED ON AN ENERGY THRESHOLD AND A PERFORMANCE THRESHOLD

BACKGROUND

A data storage device, such as a NAND data storage device, typically includes two partitions—a cache partition and a primary storage partition. Each partition includes different types of memory blocks. For example, the cache partition includes a number of single-level cell (SLC) memory blocks and the primary storage partition includes a number of quad-level cell (QLC) memory blocks. QLC memory blocks have a higher density and a lower cost when compared to SLC memory blocks. However, it is faster to write data to SLC memory blocks when compared to QLC memory blocks.

During a relocation operation, data is transferred from the cache partition to the primary storage partition. In some cases, the relocation operation is a folding operation in which data from four SLC memory blocks is written to a single QLC memory block. However, each SLC memory block that is folded into the QLC memory block may include valid data and invalid data. In other examples, a compaction operation precedes the folding operation. In a compaction operation, valid data from a first SLC memory block (or valid data from multiple SLC memory blocks) is written to a second SLC memory block while invalid data is discarded. The second SLC memory block, along with other SLC memory blocks that include only valid data, are folded into a QLC memory block.

When determining whether to perform a folding operation versus a compaction operation followed by a folding operation, the relocation operation(s) that is/are selected is typically based on performance metrics. For example, if the folding operation has better performance metrics than the compaction and folding operations, the folding operation is selected.

However, performing a relocation operation consumes a lot of resources, including energy. As energy is consumed, the operating temperature of the data storage device increases. As the operating temperature of the data storage device increases, the number of operations, including relocation operations, may need to be decreased. This can negatively impact the overall performance of the data storage device.

Accordingly, it would be beneficial for a data storage device to manage relocation operations on metrics other than performance metrics.

SUMMARY

The present disclosure describes a data storage device having a relocation management system that determines whether to perform certain relocation operations based, at least in part, on an operating temperature of the data storage device, performance metrics associated with the data storage device and/or energy metrics associated with the data storage device. For example, when a relocation operation is to be performed on the data storage device, the relocation management system determines an operating temperature of the data storage device. The relocation management system uses the operating temperature to determine or identify two thresholds—a performance threshold and an energy threshold. Each threshold is associated with a validity count (e.g., an amount of valid data in a particular memory block) and indicates whether the relocation operation should be a first relocation method or a second relocation method. In an example, the first relocation method is a compaction operation followed by a folding operation and the second relocation method is a folding operation.

If the validity count of a memory block to be included in a relocation operation is below each threshold, the first relocation method is selected. If the validity count of the memory block to be included in the relocation operation is above both thresholds, the second relocation method is selected.

However, situations will arise in which the validity count of the memory block to be included in the relocation operation falls between the two thresholds. In such examples, the relocation management system determines, based on desired performance metrics and/or based on desired energy consumption metrics, whether to select the first relocation method or the second relocation method.

In some examples, the relocation management system uses a single threshold when determining which relocation method should be used for the operation. For example, when the data storage device is in a thermal power bound state (e.g., due to an operating temperature of the data storage device exceeding an operating temperature threshold), the relocation management system uses the energy threshold to determine which relocation method will be used for the relocation operation.

Accordingly, examples of the present disclosure describe a method that includes detecting an initiation of a data relocation event in which data in a data storage device is to be moved from at least one of a first type of memory block to at least one of a second type of memory block. The method also includes determining an operating temperature of the data storage device and identifying a performance threshold and an energy threshold associated with the operating temperature of the data storage device. A validity count associated with the at least one of the first type of memory block is determined. A data relocation method for the data relocation event based is then selected. In an example, the data relocation method is selected based, at least in part, on at least one of the validity count, the performance threshold and the energy threshold. The selected data relocation method is then executed.

In another example, a data storage device is described. In an example, the data storage device includes a controller and a relocation management system. The relocation management system is operable to determine an operating temperature of the data storage device and identify a performance threshold and an energy threshold associated with the operating temperature of the data storage device. The relocation management system also determines a validity count associated with at least one of a first type of memory block that is subject to a data relocation operation in which data stored by the at least one of the first type of memory block is relocated to a second type of memory block. The relocation management system also selects a data relocation method for the data relocation operation based, at least in part, on at least one of the validity count, the performance threshold and the energy threshold. The relocation management system also causes the controller to execute the selected data relocation method.

In yet other examples, the present disclosure describes a data storage device that includes a means for determining an operating temperature of the data storage device and a means for identifying a performance threshold and an energy threshold associated with the operating temperature of the data storage device. The data storage device also includes means for determining a validity count associated with at least one of a first type of memory block that is subject to a data relocation operation in which data stored by the at least one of the first type of memory block is relocated to a second type of memory block. In an example, the data storage device also includes means for selecting a data relocation method for the data relocation operation based, at least in part, on at least one of the validity count, the performance threshold and the energy threshold. The data storage device also includes means for causing the controller to execute the selected data relocation method.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
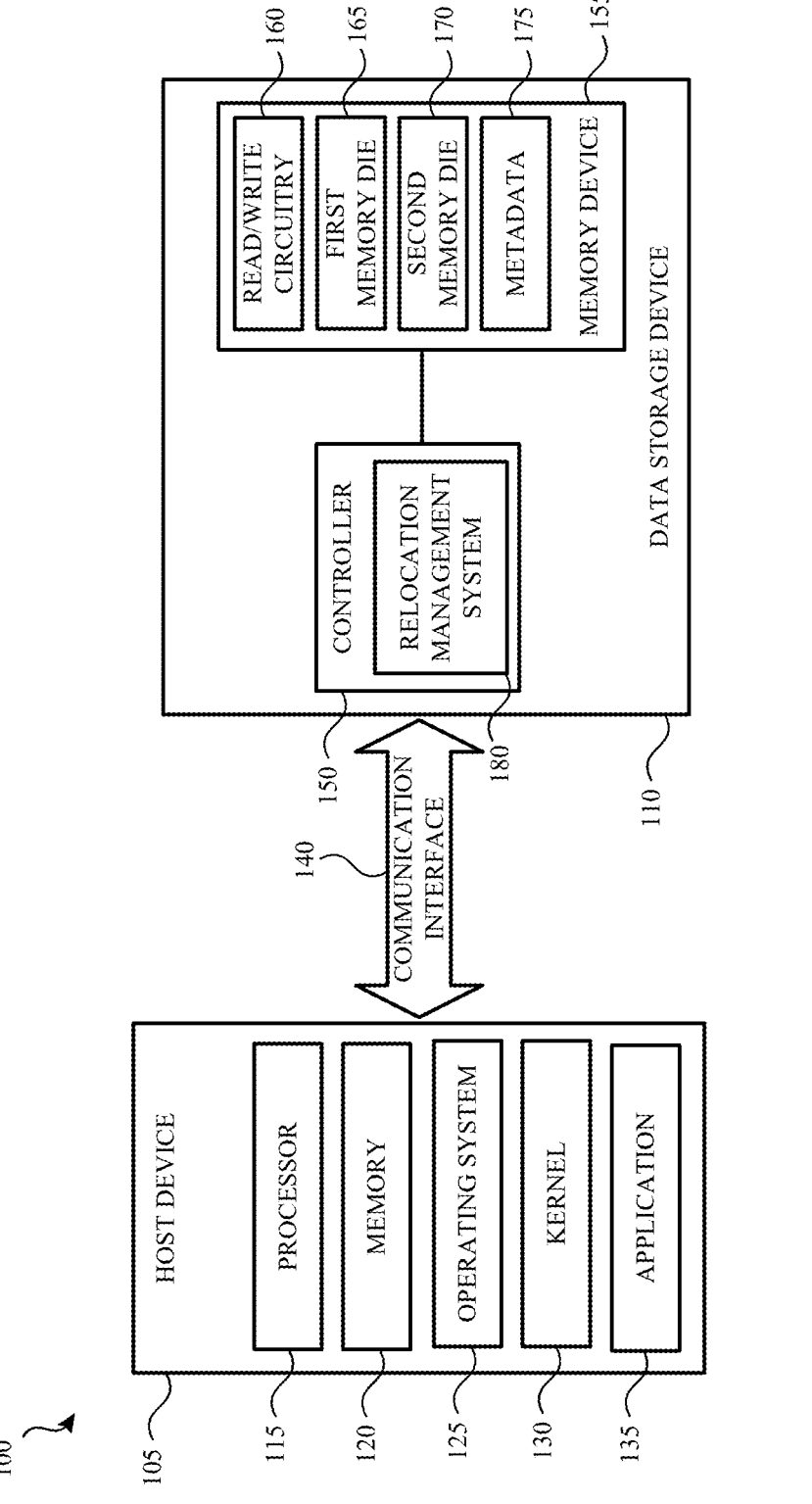
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

A data storage device, such as a NAND data storage device, typically includes two partitions and each partition includes different types of memory blocks. For example, a cache partition of the data storage device includes single-level cell (SLC) memory blocks while a primary storage partition includes a number of quad-level cell (QLC) memory blocks. QLC memory blocks have a higher density and a lower cost when compared to SLC memory blocks. However, it is faster to write data to SLC memory blocks when compared to QLC memory blocks.

Over time, data that is stored in the cache partition is relocated to the primary storage partition using various relocation operations. In some cases, the relocation operation is a folding operation in which data from four SLC memory blocks is written to a single QLC memory block.

However, in a folding operation, valid data and invalid data in each SLC memory block included in the folding operation. In other examples, a compaction operation precedes the folding operation. In a compaction operation, valid data from a first SLC memory block (or valid data from multiple SLC memory blocks) is written to a second SLC memory block (or to multiple SLC memory blocks) and the invalid data is discarded. The second SLC memory block, along with other SLC memory blocks that include only valid data, are folded into a QLC memory block.

In current solutions, the determination as to whether to perform a folding operation versus a compaction operation followed by a folding operation is based solely on performance metrics. For example, if the folding operation has better performance metrics than the compaction and folding operations, the folding operation is selected. However, performing a relocation operation consumes a lot of resources, including energy. As energy is consumed, the operating temperature of the data storage device increases. As the operating temperature of the data storage device increases, the number of operations, including the number of relocation operations that are performed, may need to be decreased. This can negatively impact the overall performance of the data storage device.

To address the above, the present disclosure describes a data storage device having a relocation management system that determines whether to perform certain relocation operations in which data stored in a first type of memory blocks is transferred to a second type of memory block. In an example, the determination as to which relocation operations are to be performed is based, at least in part, on performance metrics and/or energy metrics and on an operating temperature of the data storage device.

For example, when a relocation operation is to be performed on the data storage device, the relocation management system determines the operating temperature of the data storage device. The relocation management system uses the operating temperature to determine or identify a performance threshold and an energy threshold. In an example, the performance threshold and the energy threshold, along with the operating temperature, are stored by the data storage device (e.g., in a lookup table).

Each threshold is associated with a validity count and indicates whether the relocation operation should be a first relocation method or a second relocation method. As previously described, the first relocation method is a compaction operation followed by a folding operation and the second relocation method is a folding operation.

When memory blocks for relocation have been selected or identified, the relocation management system determines a validity count associated with the memory blocks. If the validity count of a memory blocks that are to be included in the relocation operation is below each threshold, the relocation management system selects the first relocation method and the relocation method is executed. Alternatively, if the validity count of the memory blocks to be included in the relocation operation is above both thresholds, the relocation management system selects the second relocation method and the second relocation method is executed.

However, there may be situations in which the validity count of the memory blocks to be included in the relocation operation falls between the two thresholds. In such examples, the relocation management system determines, based on desired performance metrics and/or based on desired energy consumption metrics, whether to select the first relocation method or the second relocation method. The relocation management system then causes the first relocation method or the second relocation method to be executed.

In other examples, and depending on one or more operating parameters of the data storage device, the relocation management system uses a single threshold when determining which relocation method should be used for the operation. For example, when the data storage device is in a thermal power bound state (e.g., an operating temperature of the data storage device exceeds a temperature threshold), the relocation management system uses the energy threshold to determine which relocation method will be used for the relocation operation. The selected relocation method is then executed.

Accordingly, many technical benefits may be realized including, but not limited to, improving thermal management and energy efficiency of data storage devices without negatively impacting performance and improving the endurance and the overall reliability of the data storage device.

These benefits, along with other examples, will be shown and described in greater detail with respect to FIG. 1-FIG. 7.

FIG. 1 is a block diagram of a system 100 that includes a host device 105 and a data storage device 110 according to an example. In an example, the host device 105 includes at least one processor 115 and a memory 120 (e.g., main memory). The memory 120 includes or is otherwise associated with an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 115 may include a System on a Chip (SoC).

In an example, the memory 120 is used by the host device 105 to store data used, or otherwise executed by, the processor 115. Data stored in the memory 120 may include instructions provided by the data storage device 110 via a communication interface 140. The data stored in the memory 120 may also include data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 creates a virtual address space for the application 135 and/or other processes executed by the processor 115. The virtual address space maps to locations in the memory 120. The operating system 125 also includes or is otherwise associated with a kernel 130. The kernel 130 includes instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 includes at least one controller 150 and at least one memory device 155. The controller 150 may be communicatively coupled to the memory device 155. In an example, the data storage device 110 may include multiple controllers. In such an example, one controller is responsible for executing a first operation or set of operations and a second controller is responsible for executing a second operation or set of operations.

In an example, the memory device 155 includes one or more memory dies (e.g., first memory die 165 and second memory die 170). Although two memory dies are shown, the memory device 155 may include any number of memory dies (e.g., one memory die, two memory dies, eight memory dies, or another number of memory dies). Additionally, although memory dies are specifically mentioned, the memory device 155 may include any non-volatile memory device, storage device, storage elements or storage medium including NAND flash memory cells and/or NOR flash memory cells.

In an example, one or more of the first memory die 165 and the second memory die 170 include one or more memory blocks and each memory block includes one or more memory cells. The memory cells can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

A block of memory cells is the smallest number of memory cells that are physically erasable together. In an example and for increased parallelism, each of the blocks are operated or organized in larger blocks or metablocks. For example, one block from different planes of one or more memory dies may be logically linked together to form a metablock.

In an example, the data storage device 110 and/or the memory device 155 includes, or is otherwise associated with, a first partition and a second partition and each partition includes different types of memory blocks. For example, the first partition is identified as a cache partition and includes a number of SLC memory blocks. The second partition is identified as a primary storage partition and includes a number of MLC memory blocks. Although MLC memory blocks are specifically mentioned, the primary storage partition may include TLC memory blocks, QLC memory blocks, and/or PLC memory blocks. Additionally, the data storage device 110 may implement a hybrid architecture. As such, a subset of the MLC memory blocks are identified as hybrid memory blocks. Each hybrid memory block may be programmable in a first mode (e.g., a MLC mode) or a second mode (e.g., a SLC mode).

In some examples, the data storage device 110 is attached to, or embedded within, the host device 105. In another example, the data storage device 110 is implemented as an external device or a portable device (e.g., a flash drive, a SD card) that is communicatively or selectively coupled to the host device 105. In yet another example, the data storage device 110 is a component (e.g., a solid-state drive (SSD)) of a network accessible data storage system, a network-attached storage system, a cloud data storage system, and the like.

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies includes corresponding read/write circuitry 160 that is operable to read data from and/or write data to storage elements within one individual memory die independent of other read and/or write operations on any of the other memory dies.

The memory device 155 also stores metadata 175. In an example, the metadata 175 includes information about the memory device 155 and/or information about each of the first memory die 165 and the second memory die 170. For example, the metadata 175 indicates a number of P/E cycles of each memory block (e.g., a QLC memory block) of each memory die, whether a particular memory block can be allocated as a hybrid memory block, an operating temperature of the data storage device 110, an energy threshold, a performance threshold, operating temperatures associated with each of the thresholds and the like.

As previously described, the data storage device 110 includes at least one controller 150. In an example in which multiple controllers are included, a first controller may control or implement a first set of operations while a second controller may control or implement a second set of operations.

The controller 150 is communicatively coupled to the memory device 155 via a bus, an interface or other communication circuitry. In an example, the communication circuitry includes one or more channels to enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The controller 150 receives data and/or instructions from the host device 105. The controller 150 also sends data to the host device 105. For example, the controller 150 sends data to and/or receives data from the host device 105 via the communication interface 140. The controller 150 also sends data and/or commands to and/or receives data from the memory device 155.

For example, the controller 150 sends data and a corresponding write command to the memory device 155 to cause the memory device 155 to store data at a specified address of the memory device 155. In an example, the write command specifies a physical address of a portion of the memory device 155. The controller 150 also sends data and/or commands associated with one or more background scanning operations, garbage collection operations, and/or wear leveling operations.

The controller 150 also sends one or more read commands to the memory device 155. In an example, the read command specifies the physical address of a portion of the memory device 155 at which the data is stored. The controller 150 also tracks the number of program/erase cycles or other programming operations that have been performed on or by the memory device and/or the memory dies of the memory device 155.

In an example, the controller 150 also includes or is otherwise associated with a relocation management system 180. The relocation management system 180 may be a packaged functional hardware unit designed for use with other components/systems, a portion of a program code (e.g., software or firmware) executable by a processor or processing circuitry, or a self-contained hardware and/or software component that interfaces with other components and/or systems.

The relocation management system 180 monitors the memory device 155 to determine whether to initiate a data relocation event and/or to determine that a data relocation event has been initiated. In an example, initiation of the data relocation event indicates that one or more relocation operations can and/or should be performed.

In an example, the initiation of the data relocation event is based, at least in part, on an operating state of the data storage device 110 and/or the memory device 155. In an example, the operating state of the data storage device 110 is based, at least in part, on an amount of free/available memory blocks in one or more partitions of the data storage device 110. In another example, the operating state of the data storage device 110 indicates whether the data storage device 110 is idle and/or whether one or more garbage collection operations and/or relocation operations should and/or can be performed.

When the relocation management system 180 detects the initiation of the data relocation event and/or otherwise determines, based on the operating state of the data storage device, to initiate the data relocation event, the relocation management system 180 determines an operating temperature of the data storage device 110. For example, the relocation management system 180 receives a temperature reading from a temperature sensor (e.g., temperature sensor 773 (FIG. 7)) associated with the data storage device 110.

When the operating temperature of the data storage device 110 has been determined, the relocation management system 180 determines various thresholds associated with the operating temperature. In an example, each operating temperature (or range of operating temperatures) is associated with a performance threshold and an energy threshold. The performance threshold and the energy threshold associated with each operating temperature is predetermined (e.g., in a factory setting).

In an example, the performance threshold and/or the energy threshold varies among memory dies and/or data storage devices. For example, the performance threshold and the energy threshold may vary based on manufacturing tolerances, materials used in the fabrication of the memory dies and/or the memory device 155, the quality of the memory device 155 and/or the memory dies and so on.

When the performance thresholds and the energy thresholds are determined, the values, along with the corresponding temperatures (or range of temperatures) are stored by the data storage device 110. In an example, the values are stored in a lookup table (e.g., the lookup table 200 (FIG. 2)) or other data structure.

The performance threshold is associated with a validity count (e.g., a percentage or amount of valid data in a particular memory block) and indicates an optimal performance metric between when a first relocation operation or method should be used when compared to a second relocation operation or method. For example, if the performance threshold is N, and the validity count of memory blocks that are selected for the relocation operation is below N, the first relocation operation is used to optimize performance. However, if the validity count of the memory blocks that are selected or included for the relocation operation is above (or includes) N, the second relocation operation is used to optimized performance.

Likewise, the energy threshold is associated with a validity count and indicates an optimal energy or power consumption metric between when a first relocation operation should be used when compared to a second relocation operation. For example, if the energy threshold is M, and the validity count of memory blocks that are selected for the relocation operation is below M, the first relocation operation is used to optimize energy consumption. However, if the validity count of the memory blocks that are selected or included for the relocation operation is above (or includes) M, the second relocation operation is used to optimized energy consumption.

In an example, the performance threshold is calculated as follows: performance threshold=$T_f/(T_c+T_f)$; where $T_f$ is an amount of time required to fold a first type of memory block (e.g., a SLC memory block) to a second type of memory block (e.g., a QLC memory block) and $T_c$ is an amount of time to compact the first type of memory block. Likewise, the energy threshold is calculated as follows: energy threshold=$E_f/(E_c+E_f)$; where $E_f$ is an amount of energy required to fold a first type of memory block (e.g., a SLC memory block) to a second type of memory block (e.g., a QLC memory block) and $E_c$ is an amount of energy required to compact the first type of memory block.

Figure 2:
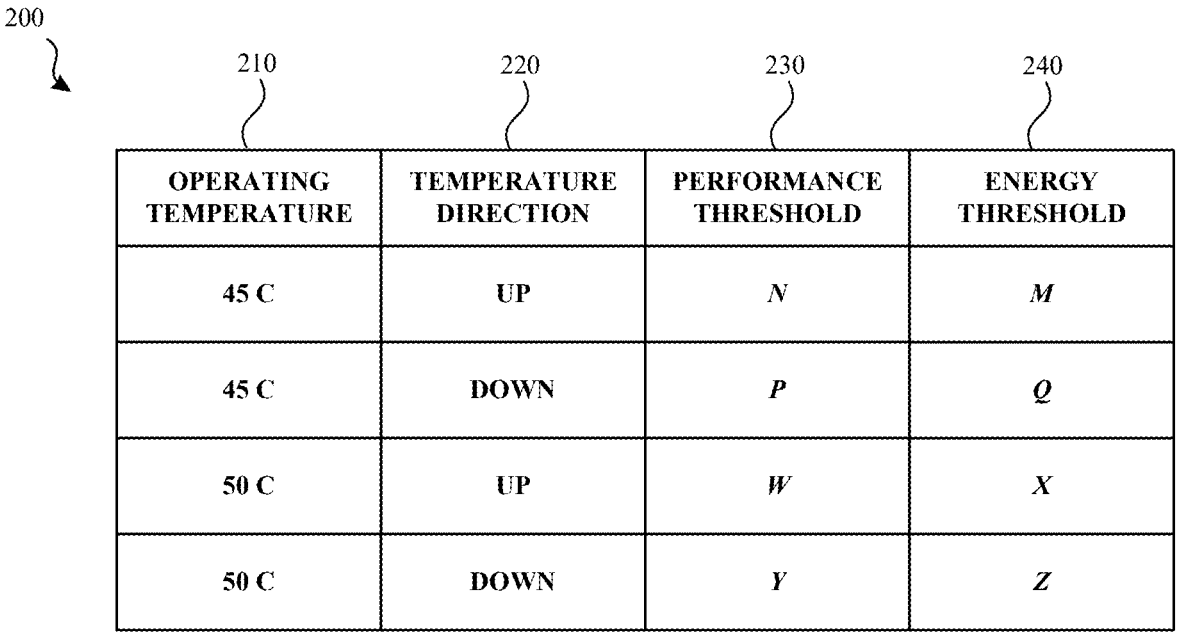
FIG. 2 illustrates a lookup table that stores a performance threshold and an energy threshold for various operating temperatures of a data storage device according to an example.

As previously indicated, when the energy threshold and the performance threshold have been determined, the threshold values, along with their associated temperatures, are stored by the data storage device. For example and referring to FIG. 2, FIG. 2 illustrates a lookup table 200 that stores a performance threshold 230 and an energy threshold 240 for various operating temperatures 210 of a data storage device according to an example. Although a lookup table 200 is shown and described, the various thresholds, and their associated operating temperatures 210, can be stored in any data structure and/or format.

In the example shown in FIG. 2, the lookup table 200 includes information corresponding to a number of different operating temperatures 210, a temperature direction 220 (e.g., whether the operating temperature 210 is increasing or decreasing), a performance threshold 230 associated with each operating temperature 210 and an energy threshold 240 associated with each operating temperature 210.

For example, when the operating temperature 210 of a data storage device is 45 degrees Celsius (C) and the operating temperature 210 is increasing, the performance threshold 230 is N and the energy threshold 240 is M. In an example, N and M may be the same value or different values. However, when the operating temperature 210 of the data storage device is 45 C and the temperature is decreasing, the performance threshold 230 is P and the energy threshold 240 in Q. In an example, N and P and/or P and Q may be the same value or different values.

In addition and as also shown in FIG. 2, when the operating temperature 210 is 50 C and is increasing, the performance threshold 230 is W and the energy threshold is X. Continuing with the example, when the operating temperature 210 is 50 C and decreasing, the performance threshold 230 is Y and the energy threshold is Z.

Although specific operating temperatures 210 are shown and described, these are for example purposes only. Further it is contemplated that the lookup table 200 is prepopulated with any number of values (e.g., as a result of factory tests and/or factory settings).

Referring back to FIG. 1, in an example, the relocation management system 180 determines that the operating temperature of the data storage device 110 is 45 C. Additionally, the relocation management system 180 determines that the operating temperature is rising. As such, the relocation management system 180 accesses the lookup table (e.g., lookup table 200 (FIG. 2)) and determines that the performance threshold is N and the energy threshold 240 is M.

As previously explained, N and M may have similar values or may have different values. If the values of each threshold are different, the relocation management system 180 determines a tradeoff range between the performance threshold and the energy threshold.

In an example the tradeoff range is the difference between the performance threshold and the energy threshold. For example, if the performance threshold is seventy-five percent (indicating that relocation operations for memory blocks having a validity count below seventy-five percent should be executed using the first relocation method and that relocation operations for memory blocks having a validity count above seventy-five percent should be executed using the second relocation method) and the energy threshold is eighty-five percent, the tradeoff range is between seventy-six percent to eighty-four percent.

The relocation management system 180 then identifies or determines a validity count associated with each memory block that is to be included in the relocation operation. When the validity count of each memory block is determined, the relocation management system 180 determines whether the validity count falls within the tradeoff range.

For example, if the relocation management system 180 determines that the memory blocks that are selected for the relocation operation have a validity count of eighty percent, the relocation management system 180 determines that these memory blocks fall within the tradeoff range. As such, the relocation management system 180 determines whether to implement the first relocation method (e.g., a compaction operation followed by a folding operation) or the second relocation method (e.g., a folding operation). When the relocation method is selected, the relocation management system 180 causes the controller 150 to execute the selected relocation method.

In an example, each relocation method is associated with a tradeoff as it relates to energy metrics and performance metrics. For example, if the relocation management system 180 selects the second relocation method (e.g., folding), an amount of energy (e.g., energy metrics) required by the folding operation decreases while the performance (e.g., performance metrics) increases.

Figure 3:
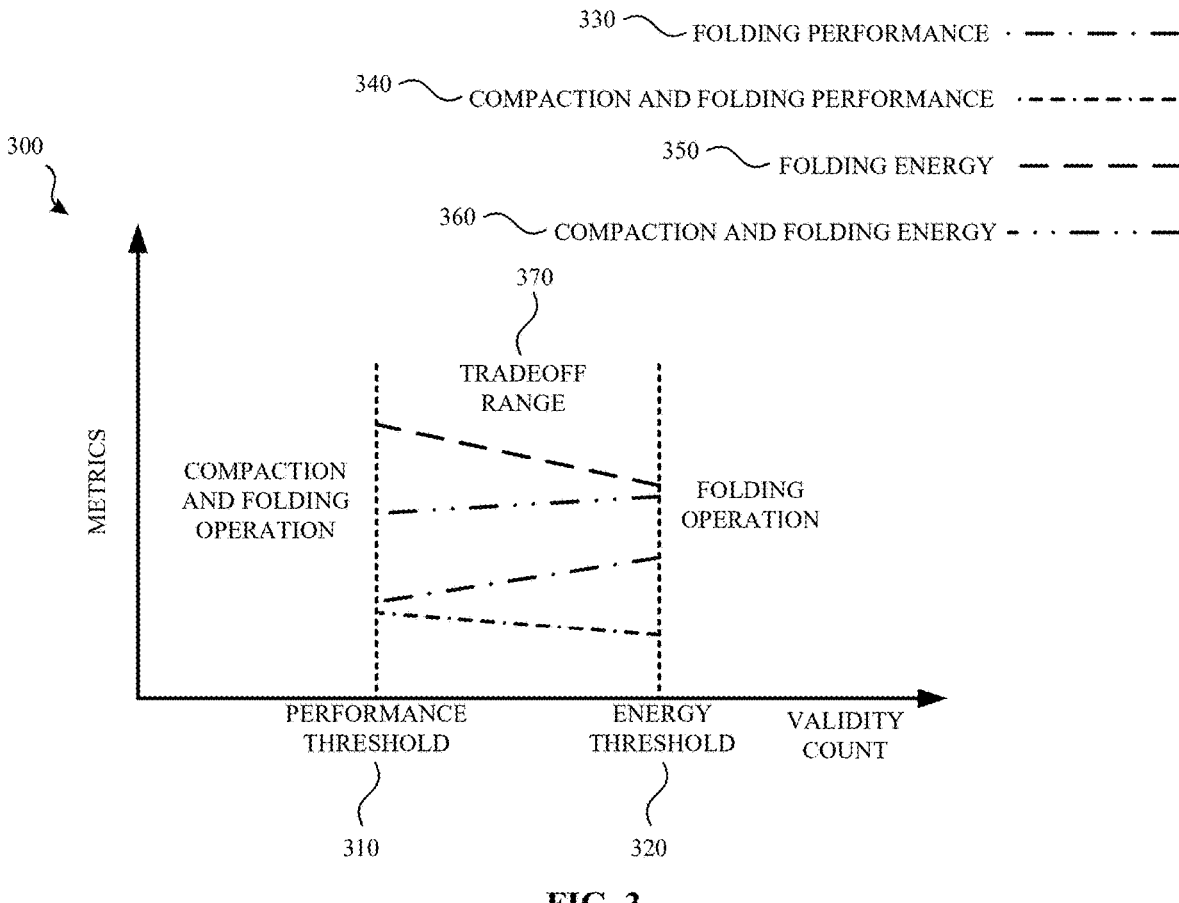
FIG. 3 illustrates a graph showing a tradeoff range between a performance threshold and an energy threshold according to an example.

For example and referring to FIG. 3, FIG. 3 illustrates a graph 300 showing a tradeoff range 370 between a performance threshold 310 and an energy threshold 320 in an example. In this example, the performance threshold 310 is lower than the energy threshold 320.

As shown in the graph 300, an amount of energy required for a folding operation decreases (represented by the folding energy line 350) as the validity count in the tradeoff range 370 increases. However, an amount of energy required for a compaction operation followed by a folding operation increases (represented by the compaction and folding energy line 360) as the validity count in the tradeoff range increases 370.

Likewise, the performance metrics of a folding operation increases (represented by the folding performance line 330) as the validity count of the memory block in the tradeoff range 370 increases. However, the performance metrics of a compaction operation followed by folding operation decreases (represented by the compaction and folding performance line 340) as the validity count of the memory block in the tradeoff range 370 increases.

As also shown in the graph 300, if the validity count of a memory block is below the performance threshold 310 and the energy threshold 320, a relocation operation that consists of a compaction operation followed by a folding operation is the most efficient (when compared with a relocation operation that only includes a folding operation) as it relates to performance and energy. If the validity count of the memory block is above the energy threshold 320 and above the performance threshold 310, a relocation operation that consists of only a folding operation is the most efficient (when compared with a relocation operation that includes a compaction operation followed by a folding operation) as it relates to performance and energy.

However, if the validity count of the memory block that is to be included in the relocation operation is in the tradeoff range 370, the relocation management system determines which relocation method to use based, at least in part, on goals of the data storage device and/or the amount of increased/decreased performance and/or the amount of increased/decreased energy consumption. In some examples, the amount of increase and/or the amount of decrease is dependent on the validity count associated with the memory blocks that are included in the relocation operations.

For example, the relocation management system may try to achieve the same or similar performance metrics while using less energy. In another example, the relocation management system may try to keep the energy budget the same while attempting to execute more operations in a particular time window. For example and based on the information shown in FIG. 3, selection of a folding operation increases the performance metrics and reduces an energy requirement of the relocation operation. As such, the relocation management system will select a folding operation.

In some examples, the relocation management system will select memory blocks having a particular validity count in order to accomplish the goals outlined above. For example, if the relocation management system determines, that in order to achieve its performance metrics and its energy consumption goals, memory blocks having a validity count of between eighty percent and eighty-two percent should be selected for relocation operations, the relocation management system identifies memory blocks that have a validity count that meet that criteria. The determined relocation operation(s) are then performed on the identified memory blocks.

Figure 4:
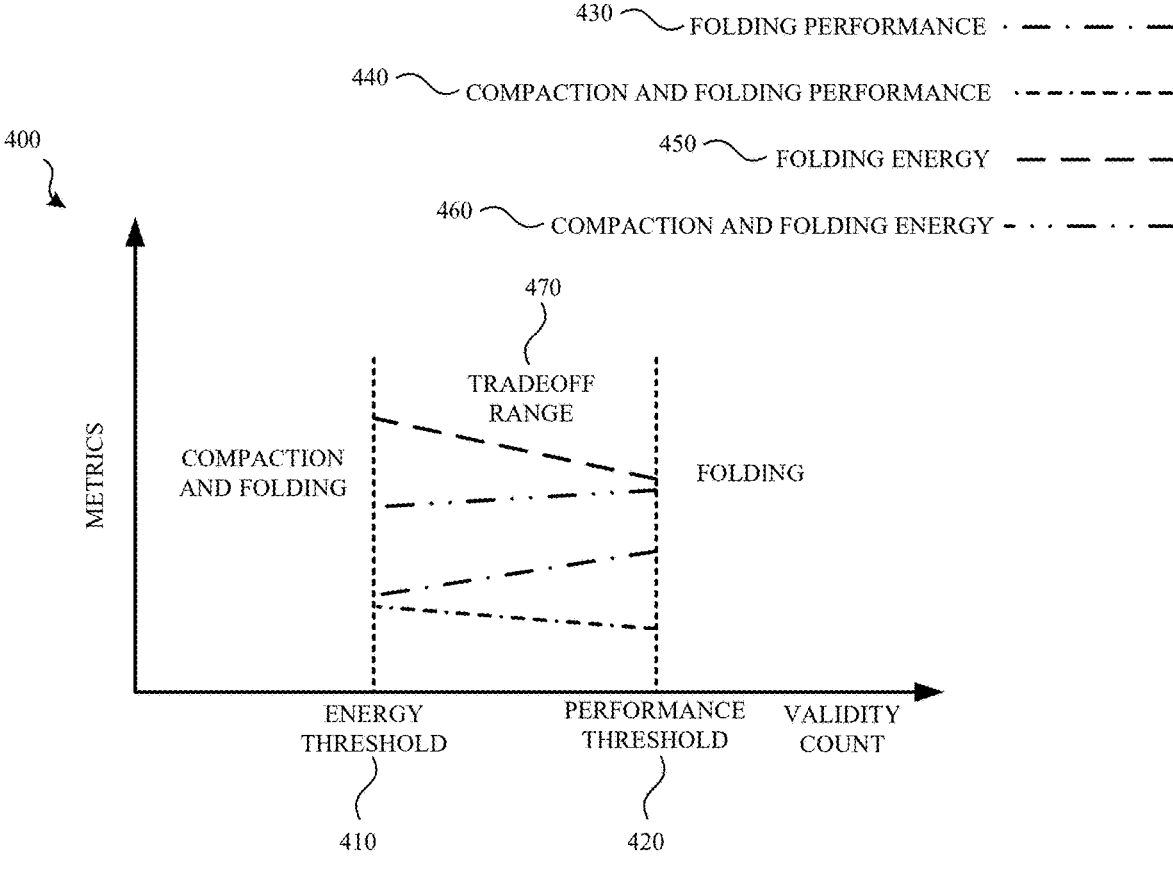
FIG. 4 illustrates a graph showing a tradeoff range between an energy threshold and a performance threshold according to another example.

FIG. 4 illustrates a graph 400 showing a tradeoff range 470 between an energy threshold 410 and a performance threshold 420 according to another example. In this example, the energy threshold 410 is lower than the performance threshold 420.

As shown in the graph 400, an amount of energy required for a folding operation decreases (represented by the folding energy line 450) as the validity count in the tradeoff range 470 increases. However, an amount of energy required for a compaction operation followed by a folding operation increases (represented by the compaction and folding energy line 460) as the validity count in the tradeoff range increases 470.

Likewise, the performance metrics of a folding operation increases (represented by the folding performance line 430) as the validity count of the memory block in the tradeoff range 470 increases. However, the performance metrics of a compaction operation followed by a folding operation decreases (represented by the compaction and folding performance line 440) as the validity count of the memory block in the tradeoff range 470 increases.

As also shown in the graph 400, if the validity count of a memory block is below the performance threshold 410 and the energy threshold 420, a relocation operation that consists of a compaction operation followed by a folding operation is the most efficient (when compared with a relocation operation that only includes a folding operation) as it relates to performance and energy. If the validity count of the memory block is above the energy threshold 420 and above the performance threshold 410, a relocation operation that consists of only a folding operation is the most efficient (when compared with a relocation operation that includes a compaction operation followed by a folding operation) as it relates to performance and energy.

However, if the validity count of the memory block that is to be included in the relocation operation is in the tradeoff range 470, the relocation management system determines which relocation method to use based, at least in part, on goals of the data storage device and/or the amount of increased/decreased performance and/or the amount of increased/decreased energy consumption. In some examples, the amount of increase and/or the amount of decrease is dependent on the validity count associated with the memory blocks that are included in the relocation operations.

For example and as shown in FIG. 4, selection of a folding operation increases the performance metrics and the performance metrics increase as the validity count increases. Additionally, energy consumption is decreasing as the validity count increases. However, the amount of energy consumed is higher when compared with the compaction operation followed by the folding operation. Thus, in this example, if folding is selected, performance metrics are better by the amount of energy usage is higher when compared with the compaction and folding operation.

Referring back to FIG. 1, in some examples, the operating temperature of the data storage device 110 may exceed an operating temperature threshold. As such the relocation management system 180 may cause the data storage device 110 to enter a thermal power bound state. When in the thermal power bound state, each operation that is executed by the controller 150 may consume more power or energy (e.g., when compared with operations that are executed when the data storage device 110 is not in the thermal power bound state). As such, the performance of the data storage device 110 is bounded by an energy budget and energy consumption for relocation operations becomes more important.

Figure 5:
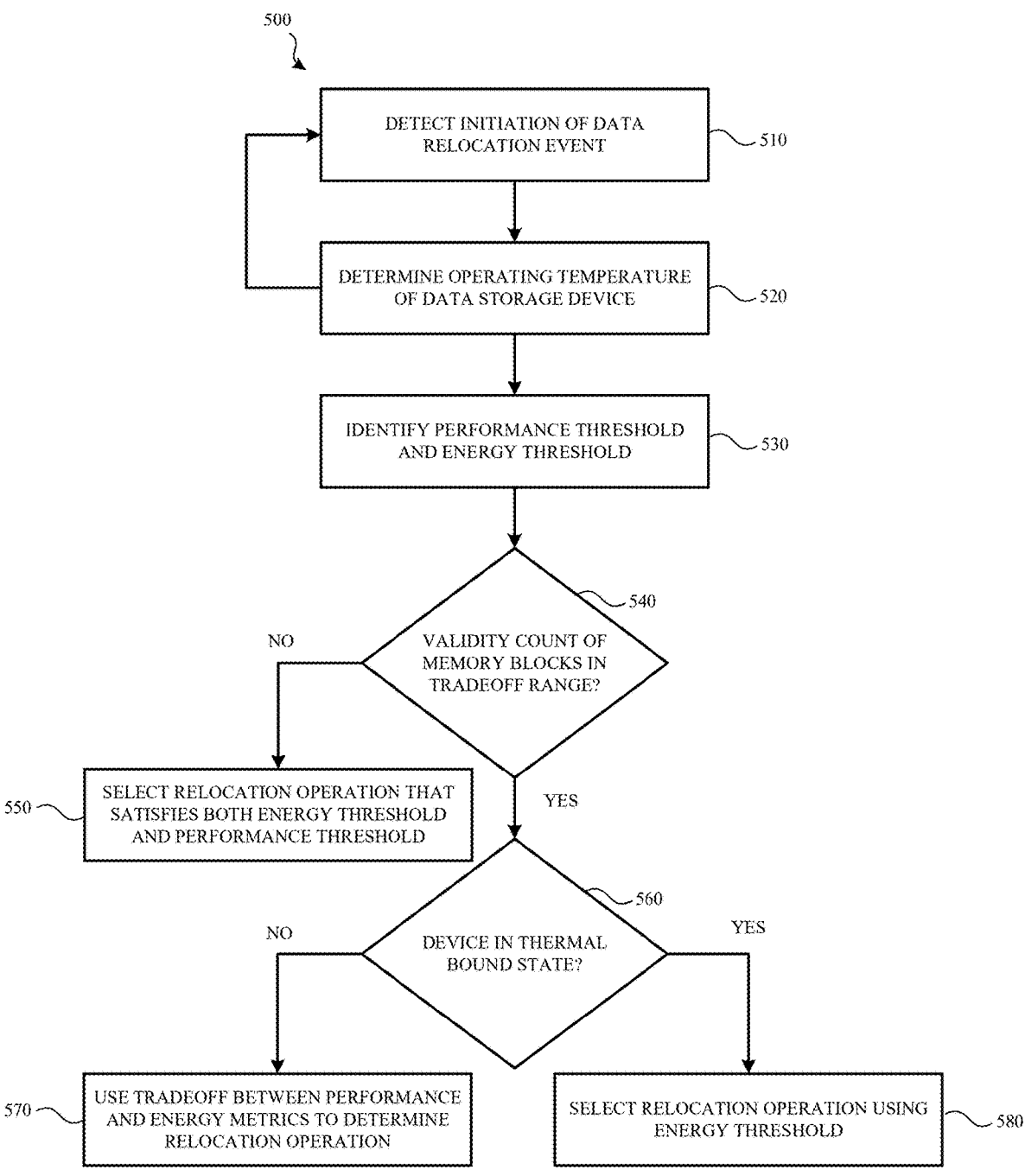
FIG. 5 illustrates a method for determining a relocation method to execute on a data storage device based, at least in part, on a performance threshold and an energy threshold according to an example.

FIG. 5 illustrates a method (500) for determining a relocation method to execute on a data storage device based, at least in part, on a performance threshold and an energy threshold according to an example. In an example, the method (500) is performed by a relocation management system (e.g., the relocation management system 180) of the data storage device such as, for example, the data storage device 110 shown and described with respect to FIG. 1.

The method (500) begins when the relocation management system detects (510) an initiation of a data relocation event. In an example, the data relocation event is detected based on an operating state of the data storage device. For example, a controller of the data storage device and/or the relocation management system may determine, based at least in part, on an amount of storage space available on the data storage device, that a data relocation event should be initiated. In another example, the controller and/or the data relocation management system determines that the data relocation event is (or should be) initiated based on the data storage device entering an idle state. Although specific examples are given, initiation of the data relocation event is detectable in a number of ways.

In an example, this operation also includes the identification of memory blocks that will be included in the data relocation event. For example, the relocation management system selects one or more of a first type of memory block that will be included in the data relocation event. As previously indicated, during the data relocation event, data in the first type of memory block will be moved to a second type of memory block of the data storage device.

In another example, the memory blocks to be included in the data relocation event are identified during a later operation of the method (500). In such examples, the memory blocks that are selected or identified are selected or identified based, at least in part, on a validity count associated with the memory block and on one or more desired metrics or goals (e.g., performance metrics/goals and/or energy metrics/goals).

When the data relocation event is detected, the relocation management system detects (520) an operating temperature (or a range of operating temperatures (e.g., over a time window)) of the data storage device. In an example, the operating temperature of the data storage device is obtained from a temperature sensor or other temperature measurement device associated with the data storage device.

When the operating temperature is detected, the relocation management system identifies (530) at least one of a performance threshold and an energy threshold associated with the operating temperature. In an example, the performance threshold and the energy threshold are preconfigured values that are determined during a testing phase of the data storage device. As previously described, each threshold is associated with a validity count and indicates whether a relocation operation to be executed should be a first relocation method or a second relocation method. In an example, the first relocation method is a compaction operation followed by a folding operation and the second relocation method is a folding operation.

When the performance threshold and the energy threshold are determined, the relocation management system determines (540) whether a validity count associated with selected memory blocks is in a tradeoff range associated with the energy threshold and the performance threshold. If the relocation management system determines (540) that the validity count of the selected memory blocks are not in the tradeoff range, the relocation management system selects (550) a relocation operation that satisfies the energy threshold and the performance threshold.

For example, if the validity count of a memory block to be included in the relocation operation is below each threshold, the first relocation method is selected. However, If the validity count of the memory block to be included in the relocation operation is above both thresholds, the second relocation method is selected. The selected relocation operation is then executed and the method (500) may be repeated.

However, if the relocation management system determines (540) that the validity count of the memory blocks is in the tradeoff range (or has selected memory blocks having a validity count that causes them to be in the tradeoff range), the relocation management system determines whether the data storage device is in a thermal bound state. For example, the relocation management system determines whether an operating temperature of the data storage device is above an operating temperature threshold.

If the relocation management system determines (560) the data storage device is not in the thermal bound state, the relocation management system uses (570) a tradeoff between performance and energy metrics to determine which relocation operation(s) to perform. The relocation management system then causes the selected relocation operation(s) to be executed. However, if the relocation management system determines (560) that the data storage device is in the thermal bound state, the relocation operation is selected (580) based on the energy threshold (and not the performance threshold). The relocation management system then causes the selected relocation operation(s) to be executed.

Figures 6, 7:
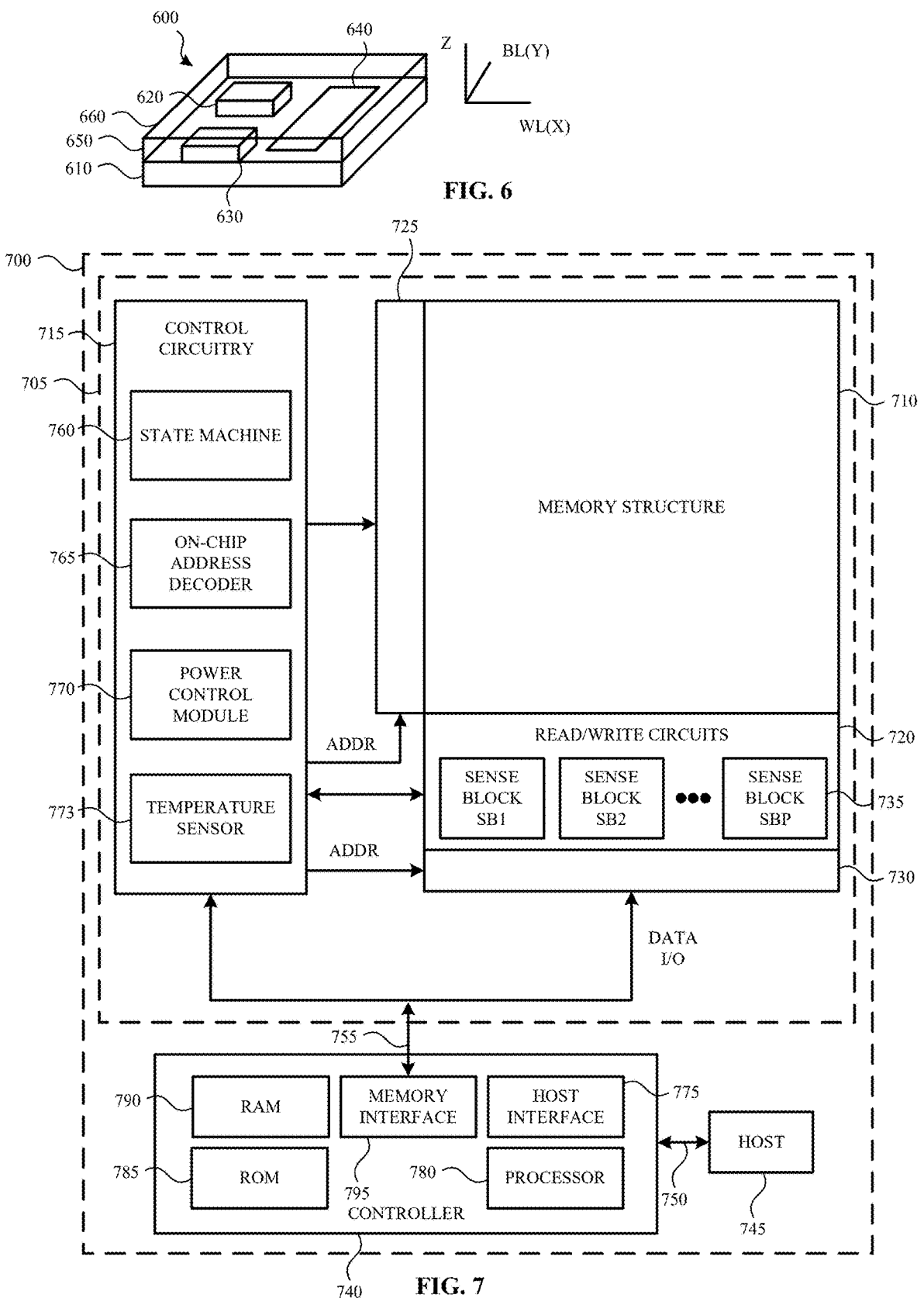
FIG. 6 is a perspective view of a storage device that includes three-dimensional (3D) stacked non-volatile memory according to an example.
FIG. 7 is a block diagram of a storage device according to an example.

FIG. 6-FIG. 7 describe example storage devices that may be used with or otherwise implement the various features described herein. For example, the storage devices shown and described with respect to FIG. 6-FIG. 7 include various systems and components that are similar to the systems and components shown and described with respect to FIG. 1. For example, the controller 740 shown and described with respect to FIG. 7 is similar to the controller 150 of FIG. 1. Likewise, the memory dies 705 are similar to the first memory die 165 and/or the second memory die 170 of FIG. 1.

FIG. 6 is a perspective view of a storage device 600 that includes three-dimensional (3D) stacked non-volatile memory according to an example. In this example, the storage device 600 includes a substrate 610. Blocks of memory cells are included on or above the substrate 610. The blocks include a first block (BLK0 620) and a second block (BLK1 630). Each block is formed of memory cells (e.g., non-volatile memory elements). The substrate 610 also includes a peripheral area 640 having support circuits that are used by the first block and the second block.

The substrate 610 also carries circuits under the blocks, along with one or more lower metal layers which are patterned in conductive paths to carry signals from the circuits. In an example, the blocks are formed in an intermediate region 650 of the storage device 600. The storage device may also include an upper region 660. The upper region 660 includes one or more upper metal layers that are patterned in conductive paths to carry signals from the circuits. Each block of memory cells includes a stacked area of memory cells. In an example, alternating levels of the stack represent word lines. While two blocks are depicted, additional blocks may be used and extend in the x-direction and/or the y-direction.

In an example, a length of a plane of the substrate 610 in the x-direction represents a direction in which signal paths for word lines or control gate lines extend (e.g., a word line or drain-end select gate (SGD) line direction) and the width of the plane of the substrate 610 in the y-direction represents a direction in which signal paths for bit lines extend (e.g., a bit line direction). The z-direction represents a height of the storage device 600.

FIG. 7 is a functional block diagram of a storage device 700 according to an example. In an example, the storage device 700 is the 3D stacked non-volatile storage device 600 shown and described with respect to FIG. 6. The components depicted in FIG. 7 are electrical circuits. In an example, the storage device 700 includes one or more memory dies 705. Each memory die 705 includes a three-dimensional memory structure 710 of memory cells (e.g., a 3D array of memory cells), control circuitry 715, and read/write circuits 720. In another example, a two-dimensional array of memory cells may be used. The memory structure 710 is addressable by word lines using a first decoder 725 (e.g., a row decoder) and by bit lines using a second decoder 730 (e.g., a column decoder). The read/write circuits 720 may also include multiple sense blocks 735 including SB1, SB2, . . . , SBp (e.g., sensing circuitry) which allow pages of the memory cells to be read or programmed in parallel. The sense blocks 735 may include bit line drivers.

In an example, a controller 740 is included in the same storage device 700 as the one or more memory dies 705. In another example, the controller 740 is formed on a die that is bonded to a memory die 705, in which case each memory die 705 may have its own controller 740. In yet another example, a controller die controls all of the memory dies 705.

Commands and data are transferred between a host 745 and the controller 740 using a data bus 750. Commands and data may also be transferred between the controller 740 and one or more of the memory dies 705 by way of lines 755. In one example, the memory die 705 includes a set of input and/or output (I/O) pins that connect to lines 755.

The memory structure 710 also includes one or more arrays of memory cells. The memory cells may be arranged in a three-dimensional array or a two-dimensional array. The memory structure 710 may include any type of non-volatile memory that is formed on one or more physical levels of arrays of memory cells having an active area disposed above a silicon substrate. The memory structure 710 may be in a non-volatile memory device having circuitry associated with the operation of the memory cells, whether the associated circuitry is above or within the substrate.

The control circuitry 715 works in conjunction with the read/write circuits 720 to perform memory operations (e.g., erase, program, read, and others) on the memory structure 710. The control circuitry 715 may include registers, ROM fuses, and other devices for storing default values such as base voltages and other parameters.

The control circuitry 715 also includes one or more of a state machine 760, an on-chip address decoder 765, a power control module 770 and a temperature sensor 773. When included, the state machine 760 provides chip-level control of various memory operations. The state machine 760 is programmable by software. In another example, the state machine 760 does not use software and is completely implemented in hardware (e.g., electrical circuits).

When included, the on-chip address decoder 765 provide an address interface between addresses used by host 745 and/or the controller 740 to a hardware address used by the first decoder 725 and the second decoder 730. When included, the power control module 770 controls power and/or voltages that are supplied to the word lines and bit lines during memory operations. The power control module 770 includes drivers for word line layers in a 3D configuration, select transistors (e.g., SGS and SGD transistors) and source lines. The power control module 770 also includes one or more charge pumps for creating voltages.

The temperature sensor 773 monitors an operating temperature of the storage device 700. In another example, the temperature sensor 773 monitors an ambient temperature associated with the storage device 700. In an example, the temperature is used to determine the various thresholds describe herein.

The control circuitry 715, the state machine 760, the on-chip address decoder 765, the first decoder 725, the second decoder 730, the power control module 770, the sense blocks 735, the read/write circuits 720, and/or the controller 740 may be considered one or more control circuits and/or a managing circuit that perform some or all of the operations described herein.

In an example, the controller 740, is an electrical circuit that may be on-chip or off-chip. Additionally, the controller 740 may include one or more processors 780, ROM 785, RAM 790, memory interface 795, and host interface 775, all of which may be interconnected. In an example, the one or more processors 780 is one example of a control circuit. Other examples can use state machines or other custom circuits designed to perform one or more functions. Devices such as ROM 785 and RAM 790 may include code such as a set of instructions. One or more of the processors 780 may be operable to execute the set of instructions to provide some or all of the functionality described herein.

Alternatively or additionally, one or more of the processors 780 access code from a memory device in the memory structure 710, such as a reserved area of memory cells connected to one or more word lines. The memory interface 795, in communication with ROM 785, RAM 790, and one or more of the processors 780, may be an electrical circuit that provides an electrical interface between the controller 740 and the memory die 705. For example, the memory interface 795 may change the format or timing of signals, provide a buffer, isolate from surges, latch I/O, and so forth. The one or more processors 780 may issue commands to control circuitry 715, or any other component of memory die 705, using the memory interface 795. The host interface 775, in communication with the ROM 785, the RAM 790, and the one or more processors 780, may be an electrical circuit that provides an electrical interface between the controller 740 and the host 745. For example, the host interface 775 may change the format or timing of signals, provide a buffer, isolate from surges, latch I/O, and so on. Commands and data from the host 745 are received by the controller 740 by way of the host interface 775. Data sent to the host 745 may be transmitted using the data bus 750.

Multiple memory elements in the memory structure 710 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

One of ordinary skill in the art will recognize that the technology described herein is not limited to a single specific memory structure, but covers many relevant memory structures within the spirit and scope of the technology as described herein and as understood by one of ordinary skill in the art. One of skill in the art also will note that while the invention is described in terms of SLC and QLC memory blocks, in some embodiments, triple-level cell (TLC) memory blocks and multi-level cell (MLC) blocks may be substituted for QLC memory blocks.

Based on the above, examples of the present disclosure describe a method, comprising: detecting initiation of a data relocation event in which data in a data storage device is to be moved from at least one of a first type of memory block to at least one of a second type of memory block; determining an operating temperature of the data storage device; identifying a performance threshold and an energy threshold associated with the operating temperature of the data storage device; determining a validity count associated with the at least one of the first type of memory block; selecting a data relocation method for the data relocation event based, at least in part, on at least one of the validity count, the performance threshold and the energy threshold; and executing the selected data relocation method. In an example, the relocation method is a folding operation. In an example, the relocation method is a compaction operation followed by a folding operation. In an example, the method also includes determining whether the data storage device has entered a thermal power bound state; and based, at least in part, on determining the data storage device has entered the thermal power bound state, selecting the data relocation method based, at least in part, on the energy threshold. In an example, selecting the data relocation method is based, at least in part, on a tradeoff between energy metrics associated with the energy threshold and performance metrics associated with the performance threshold. In an example, information corresponding to the performance threshold, the energy threshold and the operating temperature of the data storage device is stored in a lookup table. In an example, the operating temperature is a temperature range.

Examples also describe a data storage device, comprising: a controller; and a relocation management system associated with the controller and operable to: determine an operating temperature of the data storage device; identify a performance threshold and an energy threshold associated with the operating temperature of the data storage device; determine a validity count associated with at least one of a first type of memory block that is subject to a data relocation operation in which data stored by the at least one of the first type of memory block is relocated to a second type of memory block; select a data relocation method for the data relocation operation based, at least in part, on at least one of the validity count, the performance threshold and the energy threshold; and cause the controller to execute the selected data relocation method. In an example, the operating temperature of the data storage device is determined based, at least in part, on a determination that a relocation operation is to be executed. In an example, the data relocation method is a folding operation. In an example, the data relocation method is a compaction operation followed by a folding operation. In an example, the relocation management system is further operable to: determine whether the data storage device has entered a thermal power bound state; and based, at least in part, on determining the data storage device has entered the thermal power bound state, select the data relocation method based, at least in part, on the energy threshold. In an example, the data relocation method is selected based, at least in part, on a tradeoff between energy metrics associated with the energy threshold and performance metrics associated with the performance threshold. In an example, information corresponding to the performance threshold, the energy threshold and the operating temperature of the data storage device is stored in a lookup table associated with the data storage device. In an example, the operating temperature is a temperature range.

Examples also describe a data storage device, comprising: means for determining an operating temperature of the data storage device; means for identifying a performance threshold and an energy threshold associated with the operating temperature of the data storage device; means for determining a validity count associated with at least one of a first type of memory block that is subject to a data relocation operation in which data stored by the at least one of the first type of memory block is relocated to a second type of memory block; means for selecting a data relocation method for the data relocation operation based, at least in part, on at least one of the validity count, the performance threshold and the energy threshold; and means for causing a controller means to execute the selected data relocation method. In an example, the data storage device also includes a means for determining a relocation operation is to be executed on the at least one of the first type of memory block. In an example, the data relocation method is a folding operation. In an example, the data relocation method is a compaction operation followed by a folding operation. In an example, the data storage device also includes a means for determining whether the data storage device has entered a thermal power bound state; and wherein the means for selecting the data relocation method selects the data relocation method based, at least in part, on the energy threshold when it is determined the data storage device has entered the thermal power bound state.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/ or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
detecting initiation of a data relocation event in which data in a data storage device is to be moved from at least one of a first type of memory block to at least one of a second type of memory block;
determining an operating temperature of the data storage device;
identifying a performance threshold and an energy consumption threshold associated with the operating temperature of the data storage device, the performance threshold and the energy consumption threshold being associated with a validity count;
determining the validity count associated with the at least one of the first type of memory block;
selecting a data relocation method for the data relocation event based, at least in part, on at least one of the validity count, the performance threshold and the energy consumption threshold; and
executing the selected data relocation method.
2. The method of claim 1, wherein the data relocation method is a folding operation.

3. The method of claim 1, wherein the data relocation method is a compaction operation followed by a folding operation.
4. The method of claim 1, further comprising:
determining whether the data storage device has entered a thermal power bound state; and
based, at least in part, on determining the data storage device has entered the thermal power bound state, selecting the data relocation method based, at least in part, on the energy consumption threshold.
5. The method of claim 1, wherein selecting the data relocation method is based, at least in part, on a tradeoff between energy metrics associated with the energy consumption threshold and performance metrics associated with the performance threshold.
6. The method of claim 1, wherein the operating temperature is a temperature range.
7. A data storage device, comprising:
a controller; and
a relocation management system associated with the controller and operable to:
determine an operating temperature of the data storage device;
identify a performance threshold and an energy consumption threshold associated with the operating temperature of the data storage device, the performance threshold and the energy consumption threshold being associated with a validity count;
determine the validity count associated with at least one of a first type of memory block that is subject to a data relocation operation in which data stored by the at least one of the first type of memory block is relocated to a second type of memory block;
select a data relocation method for the data relocation operation based, at least in part, on at least one of the validity count, the performance threshold and the energy consumption threshold; and
cause the controller to execute the selected data relocation method.
8. The data storage device of claim 7, wherein the operating temperature of the data storage device is determined based, at least in part, on a determination that a relocation operation is to be executed.
9. The data storage device of claim 7, wherein the data relocation method is a folding operation.
10. The data storage device of claim 7, wherein the data relocation method is a compaction operation followed by a folding operation.
11. The data storage device of claim 7, wherein the relocation management system is further operable to:
determine whether the data storage device has entered a thermal power bound state; and
based, at least in part, on determining the data storage device has entered the thermal power bound state, select the data relocation method based, at least in part, on the energy consumption threshold.
12. The data storage device of claim 7, wherein the data relocation method is selected based, at least in part, on a tradeoff between energy metrics associated with the energy consumption threshold and performance metrics associated with the performance threshold.
13. The data storage device of claim 7, wherein the operating temperature is a temperature range.
14. A data storage device, comprising:
means for determining an operating temperature of the data storage device;

means for identifying a performance threshold and an energy consumption threshold associated with the operating temperature of the data storage device, the performance threshold and the energy consumption threshold being associated with a validity count;

means for determining the validity count associated with at least one of a first type of memory block that is subject to a data relocation operation in which data stored by the at least one of the first type of memory block is relocated to a second type of memory block;

means for selecting a data relocation method for the data relocation operation based, at least in part, on at least one of the validity count, the performance threshold and the energy consumption threshold; and means for causing a controller means to execute the selected data relocation method.

15. The data storage device of claim 14, further comprising means for determining a relocation operation is to be executed on the at least one of the first type of memory block.

16. The data storage device of claim 14, wherein the data relocation method is a folding operation.

17. The data storage device of claim 14, wherein the data relocation method is a compaction operation followed by a folding operation.

18. The data storage device of claim 14, further comprising:

means for determining whether the data storage device has entered a thermal power bound state; and wherein the means for selecting the data relocation method selects the data relocation method based, at least in part, on the energy consumption threshold when it is determined the data storage device has entered the thermal power bound state.

19. The method of claim 1, wherein the energy consumption threshold optimizes an amount of energy used by the data storage device based, at least in part, on the operating temperature of the data storage device.

20. The data storage device of claim 7, wherein the energy consumption threshold optimizes an amount of energy used by the data storage device based, at least in part, on the operating temperature of the data storage device.

* * * * *